United States Patent [19]

Torre et al.

[11] Patent Number: 5,591,495

[45] Date of Patent: Jan. 7, 1997

[54] COPOLYAMIDE BARRIER LAYER AND REUSABLE PACKAGING ELEMENTS MADE THEREWITH

[75] Inventors: Hans D. Torre, Ems; Manfred Hewel, Rodels, both of Switzerland

[73] Assignee: EMS-INVENTA AG, Switzerland

[21] Appl. No.: 480,832

[22] Filed: Jun. 7, 1995

Related U.S. Application Data

[63] Continuation of Ser. No. 238,584, May 5, 1994, abandoned, which is a continuation of Ser. No. 959,297, Oct. 9, 1992, abandoned.

[30] Foreign Application Priority Data

Oct. 10, 1991 [DE] Germany ............................ 41 33 781.6
Dec. 6, 1991 [DE] Germany ............................ 41 40 350.9

[51] Int. Cl.$^6$ .............................. B32B 1/08; B32B 27/34; C08G 69/26
[52] U.S. Cl. ..................... 428/35.7; 428/412; 428/474.4; 528/338; 528/346; 528/347
[58] Field of Search ................................ 428/412, 474.4, 428/35.7; 528/338, 346, 347

[56] References Cited

U.S. PATENT DOCUMENTS 4,794,158 12/1988 Hasuo et al. ............................ 528/338
4,937,130 6/1990 Clagett et al. ........................ 428/35.7

Primary Examiner—D. S. Nakarani
Attorney, Agent, or Firm—Bierman & Muserlian

[57] ABSTRACT

Copolyamide barrier layers which are durable hot-water stable and transparent. The copolyamide is amorphous and partially aromatic, and comprises
(a) 50 molar parts of substituted or unsubstituted aromatic dicarboxylic acids which are replaced by up to 60% by weight of at least one additional dicarboxylic acid selected from the group consisting of cycloaliphatic dicarboxylic acids having 8 to 24 carbon atoms, araliphatic dicarboxylic acids having 8 to 18 carbon atoms, and mixtures thereof, and (b) 50 molar parts of hexamethylene diamine, which is replaced by up to 60% by weight of at least one additional diamine, selected from the group consisting of substituted or unsubstituted aliphatic diamines having 4 to 20 carbon atoms, substituted cycloaliphatic diamines having 6 to 24 carbon atoms, araliphatic diamines having 8 to 18 carbon atoms, and mixtures thereof,
the acid groups and amino groups being present substantially in equimolar proportions.

These barrier layers are useful in reusable multilayer packaging elements, each of which contains at least one such barrier layer.

14 Claims, No Drawings

COPOLYAMIDE BARRIER LAYER AND REUSABLE PACKAGING ELEMENTS MADE THEREWITH

PRIOR APPLICATIONS

This application is a continuation of U.S. patent application Ser. No. 238,584 filed May 5, 1994, now abandoned, which is a continuation of U.S. patent application Ser. No. 959,297 filed Oct. 9, 1992, now abandoned.

This Application claims the priority of German Application DE 41 33 781.6, filed Oct. 10, 1991 and DE 41 40 350.9, filed Dec. 6, 1991.

The invention relates to durable, hot-water stable, transparent barrier layers of copolyamide for reusable multilayer packing elements, and flexible or rigid reusable multilayer packing elements having at least one barrier layer of such durable hot-water stable/transparent copolyamides.

BACKGROUND OF THE INVENTION

In the packing, food, and pharmaceutical industries, there is an increasing need for suitable plastic materials to replace glass and metal packaging, especially for foods, beverages, and pharmaceutical products. The multilayer systems used in these sectors contain, as a rule, several layers of different polymers such as polyethylenes, polypropylenes, polyvinyl chlorides and fluorides, polyvinyl alcohols, polyethylene vinyl alcohols, polyamides, ionomeric polyesters, polycarbonates, polyacrylates, and other polymers, their blends and/or their mixtures.

These packing systems generally constitute protective, barrier, and supporting systems for the above-named products. In the widest sense they comprise packaging such as flexible tubes, pipes, bottles, containers, bags, cans, and the like.

However, for the above-mentioned applications, the plastic materials must have, in addition to good processability and good mechanical properties, a barrier layer which is highly impermeable or resistant to oxygen, carbon dioxide, water vapor, and other gases and gas mixtures, such as aromatics, perfumes, and other gases or hydrocarbons, both toxic and non toxic. Very often, materials which are good oxygen barriers are permeable to water vapor. Thus, polar polymers which contain hydroxyl groups, such as cellophane and polyvinyl alcohol, constitute good oxygen barriers, but they are extremely hygroscopic and lose their barrier properties to a significant extent when they are moist. Hydrophobic polymers (such as polyolefins) constitute good barriers to water vapor, but their resistance to oxygen is poor. Polymers which have a balanced ratio of hydrophobic and hydrophilic structures, as for example polyvinyl alcohols, ethylene vinyl alcohol copolymers, and nylon (e.g. nylon 6 and 6,6) show very good barrier layer properties when the water vapor pressure is low, but as soon as the latter rises, the barrier layer becomes oxygen-permeable, which is attributable to the plasticizing action of the absorbed water.

From U.S. Pat. No. 4,826,955, barrier layers of an amorphous nylon copolymer are known. This copolyamide is composed of a lactam, m-xylylene diamine, and terephthalic acid or isophthalic acid. A disadvantage of these copolyamides is that, in the moist state, the glass transition point (Tg) drops to very low values of about 50° C.; as a result, cleaning of containers made therefrom with hot water at over 70° C. for the purpose of reuse of the container is not possible.

U.S. Pat. No. 4,696,865 describes copolyamides of hexamethylene terephthalamide (6.T) and hexamethylene isophthalamide (6.I) for use in packing containers such as bottles, these copolyamide layers having very good barrier properties against oxygen and carbon dioxide. The weight ratio of terephthalic acid to isophthalic acid in the above copolyamide is between 1.0 and 1.9, more particularly between 1 and 1.5. These copolyamides have glass transition temperatures of about 135°–165° C.; however, this value drops in the conditioned (moisturized) state below 100° C. Thus, repeated cleaning processes with hot water (having a temperature of over 60°) cannot be carried out, so that reuse of such containers is not intended or is very limited.

For sanitary reasons it must be possible to clean bottles for sugar and dye containing beverages at at least 70° C. As such prior art copolyamides are often already cloudy from their manufacture, they are not seriously considered for many types of packaging.

From EP-A-358038 are known nylon blends as well as single and multi-layer films and containers containing these nylon blends. These layers consist of an alloy of amorphous copolymers of hexamethylene isophthalamide/terephthalamide and a partially crystalline copolyamide, the latter having a melting point of at least about 145° C. In this polymer combination, on the one hand the softening point of the amorphous copolyamide decreases due to the alloying effect of the partially crystalline copolyamide. On the other hand, in the conditioned state, the blend has a much lower strength and hot form stability than in the dry state. Such alloys also become cloudy and brittle after repeated contact with hot water.

In EP-A-378856, polycarbonate containers whose outer layers consist of polycarbonate and which have an inner barrier layer of a copolyamide of nylon 6.I/6.T (an amorphous polyamide of hexamethylene diamine and a phthalic acid composition which contains about 65 weight % isophthalic acid and 35 weight % terephthalic acid) are described. Such copolyamides have a glass transition point of about 125° C. (dry) and less than 70° C. (wet). In contact with hot water, these polymers become cloudy and susceptible to breakage, which also greatly limits their reusability.

U.S. Pat. No. 4,937,130 teaches multilayer polycarbonate containers which contain, between the inner aromatic polycarbonate and the outer aromatic polycarbonate layer (and additional adhesive layers of polycarbonate/polyamide blends), an intermediate layer of a similar amorphous polyamide which consists of hexamethylene diamine, isophthalic acid, terephthalic acid, and 1,4-bisaminomethylcyclohexane. It has a glass transition temperature in the dry state of about 105° C. Upon repeated contact with hot water, however, this copolyamide becomes cloudy and susceptible to breakage, while the Tg falls below 60° C. For sweetened beverages and fruit juices, containers made of these materials cannot be reused.

Polyamide compositions with improved gas barrier layer properties are known from EP-A-409666. These polyamides consist of hexamethylene and meta-xylylene isophthalamide, adipic acid, and possibly terephthalic acid units. The glass transition temperature (dry) of this copolyamide is only about 90° C. Repeated cleaning of a container having such a polyamide barrier layer with hot water of over 70° C. to permit reuse of the container is thus not possible.

The lactam-containing copolyamides mentioned in the foregoing patents have a further disadvantage in that monomers migrate out of the copolyamide layer; this is not acceptable in packaging for the food sector, or else is objectionable toxicologically. In addition, copolyamides which have lactam building blocks absorb larger amounts of moisture, whereby the quality of the foil is further impaired.

In the packaging sector, e.g. containers for carbonated and sweet beverages, there is a great need for copolyamides with high-grade and balanced barrier and mechanical properties, which inter alia will safely withstand repeated sterilizing with hot water at 70° C. and higher, so that neither transparency, strength, flexibility, nor their barrier qualities are impaired.

While bottles for mineral water made of polyethylene terephthalate are being washed at 50°–60° C. and are reusable only to a limited extent, the cleaning requirements for containers for highly colored and sweetened beverages (with 15–20 cleaning cycles) are 80° C. and higher during a cleaning cycle period of 10–20 min.

BRIEF DESCRIPTION OF THE INVENTION

It is, therefore, an object of the invention to provide a barrier layer of copolyamide, useful for multilayer packaging or reusable multilayer packaging elements, which is both a good barrier to oxygen, carbon dioxide, water vapor, and other gases and gas mixtures, including aromatics, perfumes, toxic and nontoxic gases or hydrocarbons, and has high hot form stability, high strength and good ductility, in the dry and conditioned states. It should also be modifiable as to flexibility or rigidity through its composition, and be resistant to hot water at a temperature of at least 70° C., so that it does not become cloudy or brittle under such conditions.

DETAILED DESCRIPTION OF THE INVENTION

The various copolyamides used as barrier according to the invention show, surprisingly, similar refractive indexes to e.g. polycarbonate, so that, when combined with this material, the transparency of the composite is not impaired. Besides, the refractive index of the polyamide according to the invention can be adjusted within wide limits. It was further found, surprisingly, that the transparency of the copolyamides according to the invention is stable to hot water even at temperatures of 70° to 95° C. This makes possible the reuse of old beverage bottles, as the bottle will withstand, for example, 15 to 20 cleaning cycles at 80° C. with a cycle period of 10 to 20 minutes.

The copolyamide barrier layer according to the invention is durable, hot-water stable, and transparent; the copolyamide is a partially aromatic amorphous copolyamide of the following components:

(a) 50 molar parts of substituted or unsubstituted aromatic dicarboxylic acids, which are replaced by up to 60% by weight, based on the acids, of at least one further dicarboxylic acid, selected from the group consisting of cycloaliphatic dicarboxylic acids with 8 to 24 carbon atoms, araliphatic dicarboxylic acids with 8 to 18 carbon atoms, and mixtures thereof, and (b) 50 molar parts of hexamethylene diamine, replaced by up to 60% by weight, based on the diamine, of at least one additional diamine, selected from the group consisting of substituted or unsubstituted aliphatic diamines with 4 to 20 carbon atoms, substituted cycloaliphatic diamines with 6 to 24 carbon atoms, araliphatic diamines with 8 to 18 carbon atoms, and mixtures thereof, the acid groups and amino groups being present substantially in equimolar proportions. The components (a) and (b) do not necessarily amount to exactly 50 molar parts in each instance, and may fluctuate within certain limits, depending on whether one wants to have carboxyl- or amino-group terminated copolyamides.

In a special form of the invention, the barrier layer consists of amorphous copolyamides of essentially aromatic dicarboxylic acids such as isophthalic acid, terephthalic acid, and/or tertiary butylisophthalic acid; these may be replaced by up to 60% by weight, more particularly from 5% to 50% by weight, of additional aromatic or araliphatic dicarboxylic acids. The barrier further includes hexamethylene diamine which may be replaced by up to 60% by weight, and most particularly by 5% to 50% by weight, of at least one additional substituted or unsubstituted aliphatic, substituted cycloaliphatic or araliphatic diamine, and/or mixtures thereof.

The copolyamides according to the invention are preferably produced from:

a) substituted and/or unsubstituted aromatic dicarboxylic acids, isophthalic acid, terephthalic acid, or t-butylisophthalic acid, which may contain still other cycloaliphatic or aliphatic dicarboxylic acids. Examples of such dicarboxylic acids are: cyclohexane dicarboxylic acids, xylylene dicarboxylic acids, and diphenylpropane dicarboxylic acids; and b) hexamethylene diamine and at least one other diamine from the group consisting of substituted or unsubstituted aliphatic, substituted cycloaliphatic or araliphatic diamines, and mixtures thereof. Examples of such diamines are trimethylhexamethylene diamines, such as 2,2',4- and 2,4,4'-trimethylhexamethylene-diamine, 3,3'-dimethyl-4,4'methane (Laromin), bis-(4-amino-3,5-diethylcyclohexyl)-methane, m-xylylene-diamine, p-xylylene diamine, 1,3-diaminomethyl-cyclohexane, 3-aminomethyl-3,5,5-trimethyl-1-cyclohexyl-amine (isophorone diamine), and the like.

In particular, the copolymer is composed of units of terephthalic acid and isophthalic acid, as well as hexamethylene diamine and 3,3'-dimethyl-4,4'-diaminodicyclohexylmethane. Alternatively, it comprises units of terephthalic acid and isophthalic acid, as well as hexamethylene diamine and m-xylylene diamine. The copolyamide according to the invention has, in the dry state, a glass transition temperature of at least 135° C., more particularly of at least 140° C., which in the conditioned state does not drop below 75° C., more particularly below 80° C. Multilayer packaging contains several layers which may consist of different polymers, such as polyethylenes, polypropylenes, polyvinyl chlorides and fluorides, polyvinyl alcohols, polyethylene vinyl alcohols, polyamides, ionomers, polyesters, polycarbonates, polyacrylates, and other polymers, their blends and/or their mixtures.

In the multilayer packaging according to the invention, at least one layer may be formed by the copolyamides according to the invention which may be separate from other layers or may form with another of the above-named polymers a co-extrudate, a compound, or a mixture, and may be produced e.g. by coextrusion, deep drawing, blow-molding or similar technology.

It is of special advantage that the amorphous transparent barrier layer copolyamides according to the invention have a refractive index which can be adapted to the next adjacent polymer layer, so that there is no impairment of the transparency of the multilayer system.

The barrier layer copolyamides according to the invention will be elucidated more specifically by the following examples.

EXAMPLE 1

A 150-liter autoclave equipped with an agitator, thermocouple, nitrogen injection, and oil circulation heater was charged with monomers of the following composition: 40 mol-% hexamethylene diamine, 10 mol-% 3,3'dimethyl-4,4'diaminodicyclohexyl-methane (Laromin C 260), 4 isophthalic acid, (IPA), and 10 mol-% terephthalic acid (TPA). After adding a quantity of water which represented 35% by weight based on the solids charged, and a stabilizer (acetic acid, 0.4% by weight based on the solids charged), the batch was heated to 270° C. to 290° C. after repeated flushing with nitrogen. After reduction of the pressure, the melt was degassed and extruded by means of a spinning pump. To cool the extrusion, it was pulled through a waterbath and granulated with a cutting device. About 30 kg of a transparent copolyamide was obtained. After drying under nitrogen at 110° C., it had the following physical properties:

| rel. viscosity 0.5% m-Cresol | melt viscosity 270° C./122.6N Pa · s | End groups $NH_2$/ COOH μ eg/g | $H_2O$ % | DCS onset/Tg °C. | Refract. index $nD^{20}$ |
| --- | --- | --- | --- | --- | --- |
| 1.45 | 1534 | 23/110 | 0.021 | 152/156 | 1.5867 |

Test rods had, according to DIN 53 453 and DIN 53 456, an impact tenacity n.b., notch impact tenacity 1.87 kJ/m[1], tensile modulus of elasticity 3620 N/mm$^2$, tearing strength 75 N/mm$^2$, and tearing elongation 40%.

EXAMPLE 2

As in Example 1, an amorphous copolyamide was produced from 35 mol-% hexamethylene diamine (HMD), 15 mol-% m-xylylene diamine (MXDA), 34 mol-% isophthalic acid (IPA), and 16 mol-% terephthalic acid (TPA), having the following properties:

| rel. viscosity 0.5% m-Cresol | melt viscosity 270° C./122.6N Pa · s | End groups $NH_2$/ COOH μ eg/g | $H_2O$ % | DCS onset/Tg °C. | Refract. index $nD^{20}$ |
| --- | --- | --- | --- | --- | --- |
| 1.504 | 3232 | 33/123 | 0.005 | 134/138 | 1.6052 |

EXAMPLE 3

As in Example 1, a copolyamide was produced having the following composition: 35 mol-% HMD, 7.5 mol-% 3,3'-dimethyl-4,4-diaminodicyclohexyl methane, 7.5 mol-% m-xylylene diamine, 45 mol-% isophthalic acid, and 5 mol-% terephthalic acid. The relevant physical properties were as follows:

| rel. viscosity 0.5% m-Cresol | melt viscosity 270° C./122.6N Pa · s | End groups $NH_2$/ COOH μ eg/g | $H_2O$ % | DCS onset/Tg °C. | Refract. index $nD^{20}$ |
| --- | --- | --- | --- | --- | --- |
| 1.434 | 1300 | 35/175 | 0.002 | 154/159 | 1.5968 |

EXAMPLE 4

Another comparably produced amorphous copolyamide, produced according to Example 1, had the composition: 35 mol-% HMD, 15 mol-% m-xylylene diamine, 50 mol-% isophthalic acid.

The physical properties measured were:

| rel. viscosity 0.5% m-Cresol | melt viscosity 270° C./122.6N Pa · s | End groups $NH_2$/ COOH μ eg/g | $H_2O$ % | DCS onset/Tg °C. | Refract. index $nD^{20}$ |
| --- | --- | --- | --- | --- | --- |
| 1.486 | 1708 | 36/123 | 0.022 | 133/138 | 1.6058 |

From the four copolyamides, and for comparison, from the amorphous nylon 6.I as described in U.S. Pat. No. 4,937,130, foils 50μ thick were produced on a foil extruder. With the aid of a gas permeability tester according to DIN 53 380 (ISO 2556), the following oxygen, $CO_2$, and moisture permeabilities were measured:

| Composition in mol % | 1 | 2 | 3 | 4 | 6.I/6.T |
| --- | --- | --- | --- | --- | --- |
| HMD | 40 | 35 | 35 | 35 | 50 |
| Laromin | 10 | — | 7.5 | — | — |
| MXDA | — | 15 | 7.5 | 15 | — |
| IPA | 40 | 34 | 45 | 50 | 70 |
| TPA | 10 | 16 | 5 | — | 30 |
| Tg | 156 | 138 | 159 | 138 | 125 |
| $nD^{20}$ | 1.5867 | 1.6052 | 1.5968 | 1.6058 | 1.6043 |
| $O_2$ dry | 42 | 22 | 30 | 20 | 30 |
| $O_2$ wet | 19 | 7 | 14 | 6 | 8 |
| $CO_2$ dry | 170 | 60 | 112 | 47 | 70 |
| $H_2O$ | 7 | 5.5 | 6 | 4 | 7 |

Foil pieces, made by extrusion of the copolyamides of Examples 1 to 4 at temperatures of 280° C. on a Reifenhauser flat foil extruder, were placed for 3 hours in water at 70° C. and 80° C.; they remained flexible and transparent, whereas the foil of nylon 6.I/6.T became cloudy and brittle after only 20 min.

While only a limited number of specific embodiments of the present invention have been expressly disclosed, it is, nonetheless, to be broadly construed and not to be limited except by the character of the claims appended hereto.

What we claim is:

1. A partially aromatic, amorphous, copolyamide capable of acting as a barrier layer for polycarbonate bottles consisting essentially of
   (a) 50 molar parts of at least two alkyl substituted or unsubstituted aromatic dicarboxylic acids which are replaced by 2 to 60% by weight of at least one additional dicarboxylic acid selected from the group consisting of cycloaliphatic dicarboxylic acids having 8 to 24 carbon atoms, araliphatic dicarboxylic acids having 8 to 18 carbon atoms, and mixtures thereof, and
   (b) 50 molar parts of hexamethylene diamine, which is replaced by 5% to 50% by weight of at least one additional diamine selected from the group consisting of alkyl substituted or unsubstituted aliphatic diamines having 4 to 20 carbon atoms, alkyl substituted cycloaliphatic diamines haveing 6 to 24 carbon atoms, araliphatic diamines having 8 to 18 carbon atoms, and mixtures thereof, the acid groups and amino groups being present substantially in equimolar proportions, said copolyamide being transparent and having a dry state glass transition temperature of at least 135° C. and a conditioned glass transition temperature of at least 75° C.

2. The layer of claim 1 wherein said aromatic acids of (a) are replaced by 2% to 50% by weight of said additional acid.

3. The layer of claim 1 wherein said aromatic dicarboxylic acids is selected from the group consisting of terephthalic acid, isophthalic acid, tertiary butyl isophthalic acid, and mixtures thereof.

4. The layer of claim 1 wherein said additional diamine is selected from the group consisting of 2,2',4- and 2,4,4'-trimethylhexamethylene diamines, 3,3'-dimethyl-4,4'-diaminodicyclohexyl-methane, bis-(4-amino-3,5diethylcyclohexyl)-methane, 3-aminomethyl-3,5,5-trimethyl-1-cyclohexyl-amine, 1,3-diaminomethylcyclohexane, m-xylylene diamine, p-xylilene diamine, and mixtures thereof.

5. The layer of claim 1 wherein said copolyamide is composed of units of terephthalic acid and isophthalic acid, as well as hexamethylene diamine and 3,3'dimethyl-4,4'-diaminodicyclohexyl methane.

6. The layer of claim 1 wherein said copolyamide is composed of units of terephthalic acid, and isophthalic acid, as well as hexamethylene diamine, and m-xylylene diamine.

7. The layer of claim 1 wherein said dry glass transition temperature is at least 140° C.

8. The copolyamide of claim 1 wherein component b) is 50 molar parts of hexamethylene diamine, which is replaced by 5% to 50% by weight of at least one additional diamine selected from the group consisting of alkyl substituted cycloaliphatic diamines having 6 to 24 carbon atoms, araliphatic diamines having 8 to 18 carbon atoms, and mixtures thereof.

9. The copolyamide of claim 1 wherein component b) is 50 molar parts of hexamethylene diamine, which is replaced by 5% to 50% by weight of at least one additional alkyl substituted cycloaliphatic diamine having 6 to 24 carbon atoms.

10. The copolyamide of claim 1 wherein the aromatic dicarboxylic acids are terephthalic acid and isophthalic acid.

11. A reusable bottle having at least an outer polycarbonate and an inner polycarbonate layer and an intermediate layer of a copolyamide of claim 1.

12. A bottle of claim 11 wherein component b) is 50 molar parts of hexamethylene diamine, which is replaced by 5% to 50% by weight of at least one additional diamine selected from the group consisting of alkyl substituted cycloaliphatic diamines having 6 to 24 carbon atoms, araliphatic diamines having 8 to 18 carbon atoms, and mixtures thereof.

13. A bottle of claim 11 wherein component b) is 50 molar parts of hexamethylene diamine, which is replaced by 5% to 50% by weight of at least one additional alkyl substituted cycloaliphatic diamine having 6 to 24 carbon atoms.

14. A bottle of claim 11 wherein the two aromatic dicarboxylic acids are terephthalic acid and isophthalic acid.

* * * * *